United States Patent [19]

Moser et al.

[11] 3,852,297

[45] Dec. 3, 1974

[54] NICKEL COMPLEXES OF 2-(2-HYDROXYPHENYL)-Y-TRIAZOLES

[75] Inventors: Paul Moser, Riehen; Jean Rody, Basel, both of Switzerland

[73] Assignee: Ciba-Geigy Corporation, Ardsley, N.Y.

[22] Filed: Oct. 30, 1972

[21] Appl. No.: 302,336

[30] Foreign Application Priority Data
Nov. 10, 1971 Switzerland.................... 16322/71

[52] U.S. Cl........... 260/299, 260/45.75 N, 260/242, 260/270
[51] Int. Cl............................................ C07d 55/02
[58] Field of Search.................... 260/299, 242, 270

[56] References Cited
UNITED STATES PATENTS

| | | | |
|---|---|---|---|
| 3,600,397 | 8/1971 | Seki et al............................. | 260/299 |
| 3,632,551 | 1/1972 | Seki..................................... | 260/299 |
| 3,642,813 | 2/1972 | Kirchmayr et al................... | 260/299 |
| 3,647,810 | 3/1972 | Bayer et al.......................... | 260/299 |

*Primary Examiner*—Richard J. Gallagher

[57] ABSTRACT

New nickel complexes of 2-(2'-hydroxyphenyl)-v-triazoles are light protection agents and dyestuff acceptors for polyolefines. They are manufactured from the corresponding benzotriazoles by reaction with nickel salts and alcoholates and/or amines.

14 Claims, No Drawings

NICKEL COMPLEXES OF 2-(2-HYDROXYPHENYL)-V-TRIAZOLES

The invention relates to new nickel complexes of 2-(2′hydroxyphenyl)v-triazoles, their manufacture, their use for protecting polyolefines and, as an industrial product, the polyolefines protected with the aid of these complexes.

The new compounds have the formula I

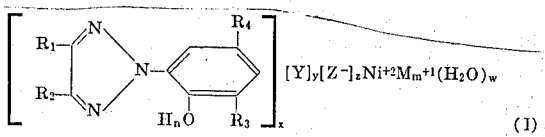

(I)

in which $R_1$ denotes an alkyl group with 1 to 18 carbon atoms, the phenyl group, or a methylphenyl, dimethylphenyl, chlorophenyl or alkoxyphenyl group, the latter with 7 to 14 carbon atoms, $R_2$ denotes hydrogen or, if $R_1$ denotes an alkyl group with 2 to 18 carbon atoms, also denotes an alkyl group which is one carbon atom lower than $R_1$, and in the case that $R_1$ denotes the phenyl group or a substituted phenyl group, also denotes an alkyl group with 1 to 16 carbon atoms, the phenyl group or a methylphenyl, dimethylphenyl, chlorophenyl or alkoxyphenyl group, the latter with 7 to 14 carbon atoms, or $R_1$ and $R_2$ together denote unsubstituted or lower alkyl-substituted tetramethylene, $R_3$ and $R_4$ independently of one another denote hydrogen, an alkyl group with 1 to 18 carbon atoms, an aralkyl group with 7 to 9 carbon atoms, a cyclo-alkyl group with 6 to 8 carbon atoms or the α-methylcyclohexyl group, with $R_3$ and $R_4$ together containing at most 22 carbon atoms, Y denotes a nitrogen-containing organic base of the following group a. amines of the formula

wherein $R_5$, $R_6$ and $R_7$ independently of one another denote hydrogen, alkyl with 1 to 18 carbon atoms, alkenyl with 3 to 18 carbon atoms, benzyl, cyclohexyl, 2-hydroxyethyl or 2-aminoethyl, or $R_5$ and $R_6$ together denote the radicals $-(CH_2)_5-$, $-(CH_2)_2-O-(CH_2)_2-$, $-(CH_2)_2-NH-(CH_2)_2-$, $-CH(CH_3)-(CH_2)_4-$, $-CH_2-CH(CH_3)-(CH_2)_3-$ or $-(CH_2)_2-CH(CH_3)-(CH_2)_2$.

b. anilines of the formula

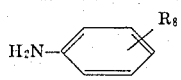

wherein $R_8$ denotes alkyl with 1 to 8 carbon atoms or alkoxy with 1 to 8 carbon atoms, or c. pyridines of the formula

wherein $R_9$ and $R_{10}$ independently of one another denote hydrogen or methyl or $R_9$ and $R_{10}$ together denote a benzo ring, $Z^-$ denotes the anion of an alkanecarboxylic acid with 2 to 18 carbon atoms, an alkenylcarboxylic acid with 3 to 18 carbon atoms, a thia- or oxaalkanecarboxylic acid with 3 to 15 carbon atoms, benzoic acid, an alkylbenzoic acid with 8 to 11 carbon atoms or a naphthoic acid, or denotes the hydroxyl ion, the chloride ion or the bromide ion, $M^{+1}$ denotes a monovalent alkali metal ion and $n$ denotes 0 or 1, $m$ denotes 0, 1 or 2, $x$ denotes 1 or 2, $y$ denotes 0 or 1, $w$ denotes all values between 0 and 2 and $z$ denotes $(2 + m) - x(1 - n)$.

It has been found, surprisingly, that the compounds of the formula I, as individual compounds or as mixtures, are good stabilisers for polyolefines against light-induced degradation. They are furthermore suitable for use as dyestuff acceptors.

It was already known to stabilise polyolefines with nickel salts of 2-hydroxyphenylbenzotriazole. As compared to these salts, the new nickel complexes provide a longer duration of protection. Furthermore, the polyolefines stabilised with the compounds of the formula I show less discolouration.

In accordance with the definition, $R_1$, $R_2$, $R_3$, $R_4$, $R_5$, $R_6$, $R_7$ and $R_8$ can be alkyl groups. Within the limits indicated under the formula I, they can be methyl, ethyl, n-propyl, iso-propyl, n-butyl, sec.-butyl, tert.butyl, n-amyl, tert.amyl, n-hexyl, n-octyl, n-decyl, n-dodecyl, n-tetradecyl, n-hexadecyl or n-octadecyl. The substituents of the phenyl radicals under $R_1$ and $R_2$, and the group $R_8$, are, for example, also alkoxy groups with 1 to 8 carbon atoms. These can be methoxy, ethoxy, propoxy, butoxy, hexoxy or octoxy groups. If $R_1$ and $R_2$ are substituted phenyl groups, the substituents can be in the o-, m- and/or p-position. The groups $R_3$ and $R_4$ also have the meaning of aralkyl with 7 to 9 carbon atoms, such as benzyl, α-methylbenzyl or α,α-dimethylbenzyl, or the meaning of cycloalkyl, such as cyclohexyl or cyclooctyl; if $R_5$, $R_6$ and $R_7$ are alkenyl groups, they can, within the limits indicated under the formula I, be propenyl, butenyl, hexenyl, octenyl, decenyl, dodecenyl, tetradecenyl, hexadecenyl or octadecenyl. $R_1$ and $R_2$ together can be tetramethylene which is substituted by lower alkyl with 1 to 4 carbon atoms, such as methyl, ethyl, propyl or butyl. $Z^-$ can have the meaning of an anion of a fatty acid with 2 to 18 carbon atoms, such as, for example, the anion of an alkanecarboxylic acid with 2 to 18 carbon atoms or of an alkenylcarboxylic acid with 3 to 18 carbon atoms, such as acetic acid, butyric acid, 2-ethylcaproic acid, lauric acid, palmitic acid, stearic acid or oleic acid. $Z^-$ can however also denote a thiaalkanecarboxylic acid with 3 to 15 carbon atoms, such as methyl-mercaptoacetic acid, n-butylmercaptoacetic acid or 3-dodecyl-mercaptopropionic acid, or an oxaalkanecarboxylic acid with 3 to 15 carbon atoms, such as methoxyacetic acid, dodecyloxyacetic acid, 3-heptyloxypropionic acid and 3-dodecyloxypropionic acid. As a naphthoic acid, $Z^-$ can be α- or β-naphthoic acid. The alkyl substituents of benzoic acid under $Z^-$ can denote methyl, ethyl, propyl or butyl. The alkali metals $M^{+1}$ can be lithium, sodium or potassium. Preferred compounds of the formula I are those in which $R_1$ and $R_2$ denote phenyl, $R_1$ denotes phenyl and $R_2$ denotes methyl, or $R_1$ and $R_2$ together denote tetramethylene, $R_3$ and $R_4$ denote branched or unbranched alkyl with 1 to 10 carbon atoms, Y denotes an amine of the formula $NH_2R_5$, wherein $R_5$ is alkyl or alkenyl with 12 to 18 carbon atoms, $Z^-$ denotes chlorine or the anion of acetic acid, 2-ethylcaproic acid, palmitic acid, stearic acid, oleic acid or benzoic acid and $M^{+1}$ denotes the sodium ion or potassium ion. Examples of compounds according to the invention are listed in the table which follows, wherein $R_1$ to $R_4$, Y, $Z^-$, $M^{-1}$, m, n, x, y and z have the meaning explained for the formula I.

tomary in the art, before or during shaping, or by applying the dissolved or dispersed compounds to the poly-

| $R_1$ | $R_2$ | $R_3$ | $R_4$ | Y | $Z^\ominus$ | M | Co-efficients | | | | |
|---|---|---|---|---|---|---|---|---|---|---|---|
| | | | | | | | m | n | x | y | z |
| $CH_3$ | $CH_3$ | H | Tert.butyl | | Oleate | K | 1 | 0 | 2 | 0 | 1 |
| $CH_3$ | $C_2H_5$ | H | H | 4-dodecyloxyaniline | Myristate | | 0 | 1 | 2 | 1 | 2 |
| $CH_3$ | $C_6H_5$ | H | Tert. amyl | Stearylamine | Heptanoate | | 0 | 1 | 2 | 1 | 2 |
| $CH_3$ | $C_6H_5$ | Sec. butyl | Tert. butyl | Cyclohexylamine | 3-heptyloxypropionate | | 0 | 1 | 1 | 1 | 2 |
| $C_{10}H_{21}$ | $C_6H_5$ | H | Sec. butyl | Di-decylamine | Palmitate | | 0 | 1 | 2 | 1 | 2 |
| $C_{10}H_{21}$ | $C_6H_5$ | H | do | Pyridine | 2-ethylhexanol | | 0 | 1 | 2 | 1 | 2 |
| $C_{10}H_{21}$ | $C_6H_5$ | H | Tert. butyl | Piperidine | 3-dodecyl-mercaptopropionate | | 0 | 1 | 2 | 1 | 2 |
| $C_{10}H_{21}$ | $C_6H_5$ | H | do | Tributylamine | Oleate | | 0 | 1 | 2 | 1 | 2 |
| $C_{10}H_{21}$ | $C_6H_5$ | H | do | do | do | | 0 | 1 | 1 | 1 | 2 |
| $C_{10}H_{21}$ | $C_6H_5$ | Cyclohexyl | Methyl | Benzylamine | Naphthenate(2) | | 0 | 1 | 1 | 1 | 2 |
| $C_6H_5$ | $C_6H_5$ | H | H | | Stearate | Li | 1 | 0 | 2 | 0 | 1 |
| $-CH_2-CH_2-CH_2-CH_2-$ (cyclic) | | H | Sec. butyl | Morpholine | Palmitate | | 0 | 1 | 2 | 1 | 2 |
| $-CH_2-CH_2-CH_2-CH_2-$ (cyclic) | | H | do | N-2-hydroxethylamine | Benzoate | | 0 | 1 | 1 | 1 | 2 |
| $-CH_2-CH_2-CH_2-CH_2-$ (cyclic) | | H | Tert. butyl | | 3-dodecyl-mercaptopropionate | K | 1 | 0 | 2 | 0 | 1 |
| $-CH_2-CH_2-CH_2-CH_2-$ (cyclic) | | H | do | | do | K | 1 | 0 | 1 | 0 | 2 |
| $-CH_2-CH_2-CH_2-CH_2-$ (cyclic) | | H | do | Piperazine | Oleate | | 1 | 0 | 1 | 0 | 2 |
| $-CH_2-CH_2-CH_2-CH_2-$ (cyclic) | | H | Tert. amyl | Aniline | Stearate | | 0 | 1 | 2 | 1 | 2 |
| $-CH_2-CH_2-CH_2-CH_2-$ (cyclic) | | α-Methylbenzyl | Methyl | 2-ethylhexylamine | Laurate | | 0 | 1 | 1 | 1 | 2 |

If the compounds of the formula I are used as mixtures, they are preferably mixtures in which $R_1$, $R_2$, $R_3$, $R_4$, Y, $Z^-$ and $M^{+1}$ have the same meaning in all compounds of the mixture, whilst amongst the coefficients n, m, w, x, y and z at least one differs.

The compounds of the formula I protect polyolefines against degradation, preferably α-olefine polymers, such as polypropylene, optionally crosslinked polyethylene, polyisobutylene, polymethylbutene-1, polymethylpentene-1, polybutene-1, polyisoprene and polybutadiene; copolymers of the monomers on which the homopolymers mentioned are based, such as ethylenepropylene copolymers, propylene-butene-1 copolymers, and terpolymers of ethylene and propylene with a diene such as, for example, hexadiene, dicyclopentadiene or ethylidenenorbornene; mixtures of the abovementioned homopolymers, such as, for example, mixtures of polypropylene and polyethylene, polypropylene and poly-butene-1, and polypropylene and polyisobutylene. Polypropylene, and its mixtures and the copolymers which contain propylene units are preferred.

The compounds of the formula I are incorporated into the substrates in a concentration of 0.01 to 5% by weight calculated relative to the material to be stabilised. Preferably, 0.05 to 1.5, and especially preferentially 0.1 to 0.8% by weight of the components, calculated relative to the material to be stabilised, are incorporated into the material to be stabilised.

The incorporation can be effected after the polymerisation, for example by mixing in at least one of the compounds of the formula I, and optionally further additives, in the melt in accordance with the methods customary in the art, before or during shaping, or by applying the dissolved or dispersed compounds to the polymer, if appropriate with subsequent evaporation of the solvent.

In the case of crosslinked polyethylene the compounds are added before crosslinking. As further additives, together with which the stabilisers usable according to the invention can be employed, there should be mentioned:

1. Antioxidants of the aminoaryl and hydroxyaryl series. Amongst the latter, the sterically hindered phenol compounds should be mentioned, for example: 2,2'-thiobis-(4-methyl-6-tert.butylphenol), 4,4'-thiobis-(3-methyl-6-tert.butylphenol), 2,2'-methylene-bis-(4-methyl-6-tert.butylphenol), 2,2'-methylene-bis-(4-ethyl-6-tert.butylphenol), 4,4'-methylene-bis-(2-methyl-6-tert.butylphenol), 4,4-'butylidene-bis-(3-methyl-6-tert.butylphenol), 2,2-'methylene-bis-[4-methyl-6-(α-methylcyclohexyl)-phenol], 2,6-di(2-hydroxy-3-tert.butyl-5-methylbenzyl)-4-methyl-phenol, 2,6-di-tert.butyl-4-methylphenol, 1,1,3-tris-2-methyl-(4-hydroxy-5-tert.butyl-phenyl)-butane, 1,3,5-trimethyl-2,4,6-tri-(3,5-di-tert.butyl-4-hydroxy-benzyl)-benzene, esters of β-4-hydroxy-3,5-di-tert.butylphenyl-propionic acid with monohydric or polyhydric alcohols, such as methanol, ethanol, octadecanol, hexanediol, nonanediol, thiodiethylene glycol, trimethylolethane or pentaerythritol, 2,4-bis-octylmercapto-6-(4-hydroxy-3,5-di-tert.butylanilino)-s-triazine, 2,4-bis(4-hydroxy-3,5-di-tert.butylphenoxy)-6-octylmercapto-s-triazine, 1,1-bis-(4-hydroxy-2-methyl)-5-tert.buytl-phenyl)-3-dodecylmercapto-butane, 4-hydroxy-3,5-di-tert.butylbenzyl-phosphonic acid esters, such as the dimethyl, diethyl or dioctadecyl ester, (3-methyl-4-hydroxy-5-tert.butylbenzyl)-malonic acid dioctadecyl ester, s-(3,5-dimethyl-4-hydroxyphenyl)-thioglycollic acid octadecyl ester, and esters of bis-(3,5-di-tert.butyl-4-hydroxybenzyl)-malonic acid, such as the didodecyl ester, the dioctadecyl ester and the 2-dodecylmercaptoethyl ester.

Amongst the aminoaryl derivatives, aniline and naphthylamine derivatives and their heterocyclic derivatives should be mentioned, for example phenyl-1-naphthylamine, phenyl-2-naphthylamine, N,N'-diphenyl-p-phenylenediamine, N,N'-di-2-naphthyl-p-phenylenediamine, N,N'-di-sec.butyl-p-phenylenediamine, 6-ethoxy-2,2,4-trimethyl-1,2-dihydroquinoline, 6-dodecyl-2,2,4-trimethyl-1,2-dihydroquinoline, mono- and di-octyliminodibenzyl, and polymerised 2,2,4-trimethy-1,2-dihydroquinoline, though in the case of the combined use of the compounds of the formula I with the abovementioned amine compounds the stabilised polymer no longer possesses such good colour properties, because of the tendency of the amine compounds to discolour.

2. UV-absorbers and light protection agents such as:
  a. 2-(2'-Hydroxyphenyl)-benzotriazoles, such as, for example, the 5'-methyl-; 3',5'-di-tert.butyl-; 5'-tert.butyl-; 5-chloro-3'5'-di-tert.butyl-; 5-chloro-3'-tert.butyl-5'-methyl-; 3'5'-di-tert.amyl-; 3'-methyl-5'-β-carbomethoxyethyl and 5-chloro-3',5'-di-tert.amyl derivative.
  b. 2,4-Bis-(2'-hydroxyphenyl)-6-alkyl-s-triazines, for example the 6-ethyl or 6-undecyl derivative,
  c. 2-Hydroxy-benzophenones, for example the 4-hydroxy-, 4-methoxy-, 4-octoxy-, 4-decyloxy-, 4-dodecyloxy-4,2', 4'-tri-hydroxy- or 2'-hydroxy-4,4'-dimethoxy derivative
  d. 1,3-Bis-(2'-hydroxybenzoyl)-benzenes, for example the 1,3-bis-(2'-hydroxy-4'-hexyloxybenzoyl)-benzene, 1,3-bis(2'-hydroxy-4'-octoxybenzoyl)-benzene and 1,3-bis-(2'-hydroxy-4'-dodecyloxy-benzoyl)-benzene.
  e. Aryl esters of optionally substituted benzoic acids, such as, for example, phenyl salicylate, octylphenyl salicylate, benzolresorcinol, dibenzoylresorcinol, 3,5-di-tert.butyl-4-hydroxybenzoic acid 2,4-di-tert.butyl-phenyl ester or -octadecyl ester.
  f. Acrylates, for example α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester and N-(β-carbomethoxy-vinyl)-2-methylindoline.
  g. Oxalic acid diamides, for example 4,4'-di-octyloxyoxanilide, 2,2'-di-octyloxy-5,5'-di-tert.butyl-oxanilide, and 2,2'-di-dodecyloxy-5,5'-di-tert.butyl-oxanilide.

3. Phosphites such as triphenylphosphite, diphenylalkylphosphites, phenyldialkylphosphites, trinonylphenylphosphites, trilaurylphosphite, trioctadecylphosphite, 3,9-di-isodecyloxy-2,4,8,10-tetraoxa-3,9-diphosphaspiro-(5,5)-undecane and tri-(4-hydroxy-3,5-di-tert.butylphenyl)-phosphite.

4. Nucleating agents such as 4-tert.butylbenzoic acid, adipic acid and diphenylacetic acid.

5. Peroxide-destroying compounds such as esters of β-thiodipropionic acid, for example the lauryl, stearyl, myristyl or tridecyl ester. Salts of 2-mercaptobenzimidazoles, for example the zinc salt, and diphenylthiourea.

6. Other additives such as plasticisers, antistatic agents, dyeing auxiliaries, flameproofing agents, pigments, carbon black, asbestos, glass fibres, kaolin, talc and blowing agents.

7. Co-stabilisers having a synergistic effect, such as salts of alkaline earths, preferably salts of alkaline earths and carboxylic acids, such as calcium stearate, calcium palmitate, calcium oleate and calcium laurate.

The compounds according to the invention can be manufactured above all by two reaction routes which are in themselves known:

If $y$ is to be 0, that is to say if the compound manufactured is not to contain any amines, one mol of a compound of the formula II

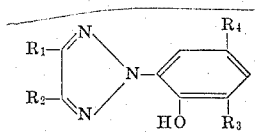

in which $R_1$, $R_2$, $R_3$ and $R_4$ have the meaning indicated under the formula I, is reacted with one mol of an alkali alcoholate and half a mol of a nickel salt of the formula $$NiZ_2 \cdot (H_2O)_v \qquad (III)$$

wherein Z has the meaning indicated under the formula I and $v$ represents a number at least as great as $w$, for example 0 to 6, in a solvent. Instead of the alkali alcoholate, a strongly basic low molecular amine or ammonia can optionally also be used.

To manufacture the compounds of the formula I containing amines, with $y = 1$, one mol of a compound of the formula II is reacted with 1½ mols of an amine which is denoted by Y in the formula I, and ½ mol of a nickel salt of the formula III, in a solvent.

To manufacture compounds of the formula I which contain both the amines denoted by Y in the formula I, and the anions denoted by Z⁻, one mol of a compound of the formula II is reacted with one mol of an alkali alcoholate, half a mol of a nickel salt of the formula III and ½ to 1½ mols of an amine Y, in a solvent.

Suitable solvents for these reactions are alcohols, expecially methanol, ethanol and isopropanol, and also chloroform, benzene, toluene and mixtures of these solvents.

Since the manufacturing processes described are equilibrium reactions, the compounds formed are in most cases obtained as mixtures which contain various compounds described by the formula I, which are in equilibrium in the particular reaction medium. Such mixtures obtained by the manufacturing processes described are also suitable for use as light stabilisers for polyolefines.

The manufacture of the starting compounds of the formula II in which $R_1$ and $R_2$ denote radicals which are independent of one another is described in French Patent Specification No. 1,559,131. Starting compounds in which $R_1$ and $R_2$ denote tetramethylene are obtained by hydrogenation of the corresponding benzotriazoles in ethyl acetate at room temperature in the presence of Raney nickel.

The invention is described in more detail in the examples which follow. Therein, % denotes % by weight.

EXAMPLE 1

175 ml of an 0.6 molar sodium methylate solution are introduced dropwise into a solution of 32.9 g (0.105 mol) of 2-(2-hydroxyphenyl)-4,5-di-phenyl-1,2,3(2H)-triazole and 12.4 g (0.050 mol) of nickel acetate tetrahydrate in 400 ml of methanol at 60°C. Hereupon a precipitate separates out which after cooling the suspension is filtered off and is dried at 60°C and a pressure of 11 mm. In this way, a blue-green nickel complex of the triazole mentioned is obtained, which is soluble to the extent of more than 10% in cold benzene and which contains 8.2% of nickel, 11.7% of nitrogen and 3.8% of acetate ions.

EXAMPLE 2

100 ml of a 1 molar sodium ethylate solution are added dropwise to a solution of 31.3 g (0.100 mol) of 2-(2-hydroxyphenyl)-4,5-di-phenyl-1,2,3(2H)-triazole and 31.3 g (0.050 mol) of nickel stearate in 650 ml of chloroform at 25°C. The sodium stearate which hereupon precipitates is filtered off, the filtrate is evaporated and the residue is extracted with methylene chloride at room temperature. After evaporating the solvent, the extract is dried at 50°C and a pressure of 11 mm. In this way, a nickel complex of the triazole mentioned, containing stearate ions, is obtained as a light green powder which is readily soluble in cold ligroin and which contains 7.1% of nickel and 10.6% of nitrogen.

EXAMPLE 3

12.4 g (0.050 mol) of nickel acetate tetrahydrate dissolved in 25 ml of ethanol are added dropwise to a solution of 32.0 g (0.102 mol) of 2-(2-hydroxy-phenyl)-4,5-di-phenyl-1,2,3(2H)triazole and 30.6 g of n-dodecylamine (0.165 mol) in 380 ml of ethanol at room temperature. Towards the end of the addition of the nickel salt, a precipitate separates out which is filtered off, washed with cold methanol and dried at 50°C and a pressure of 11 mm. In this way a blue-green nickel complex of the triazole mentioned, which contains dodecylamine and is readily soluble in cold benzene is obtained, containing 7.6% of nickel and 11.3% of nitrogen in addition to 0.5% of co-ordinatively bonded water.

EXAMPLE 4

12.4 g (0.050 mol) of nickel acetate tetrahydrate dissolved in 45 ml .. are added dropwise to a solution of 32.3 g (0.103 mol) of 2-(2-hydroxyphenyl)-4,5-di-phenyl-1,2,3(2H) triazole and 41.5 g (0.155 mol) of oleylamine in 800 ml of methanol at 60°C. A resin which partially forms is dissolved by adding a little ether. On cooling and stirring, a crystalline precipitate forms, which is filtered off and washed with cold methanol. In this way a light green nickel complex of the triazole mentioned, which contains oleylamine and is readily soluble in cold ligroin is also obtained, containing 6.6% of nickel and 10.3% of nitrogen in addition to co-ordinatively bonded water.

EXAMPLE 5

8.84 g of anhydrous nickel acetate dissolved in 800 ml of absolute ethanol with addition of 1.56 g of glacial acetic acid are added dropwise to a solution of 31.3 g (1.00 mol) of 2-(2-hydroxyphenyl)-4,5-phenyl-1,2,3(2H)-triazole and 25.2 g (0.158 mol) of 2-hydroxyethyl-heptylamine in 1,000 ml of absolute ethanol. A blue solution is produced, which is evaporated to dryness. The residue is taken up in hexane, the extractant is evaporated off and the extract is freed of excess amine at 50°C and a pressure of 11 mm. In this way, a nickel complex of the triazole mentioned, containing acetate ions, is obtained as a light blue powder which is readily soluble in non-polar solvents and which contains 5.9% of nickel and 9.3% of nitrogen.

EXAMPLE 6

3.77 g (0.010 mol) of 2-(2-hydroxyphenyl)-4-phenyl-5-n-decyl-1,2,3(2H)-triazole are dissolved in 150 ml of absolute ethanol. 100 ml of an 0.1 molar sodium ethylate solution are added dropwise to this solution, followed by 0.648 g (0.005 mol) of anhydrous nickel chloride dissolved in 700 ml of absolute ethanol. After some time, a precipitate separates out, which is filtered off. The filtrate is evaporated to dryness and the residue is extracted with cold hexane. After evaporating off the extractant, a nickel complex of the triazole mentioned is obtained as a green oil which contains 0.6% of chloride ions, 6.3% of nickel and 9.6% of nitrogen.

EXAMPLE 7

8.84 g (0.050 mol) of anhydrous nickel acetate, which are dissolved in 800 ml of absolute ethanol with the addition of 1.56 .. of glacial acetic acid, are slowly added dropwise to a solution of 25.1 g (0.100 mol) of 2-(2-hydroxyphenyl)-4-methyl-5-phenyl-1,2,3(2H)-triazole and 63.2 g (0.341 mol) of n-dodecylamine in 300 ml of absolute ethanol. A clear solution is produced, which is evaporated to dryness in vacuo. An oil is obtained, which when triturated with cold ethanol solidifies to a crystalline mass which is dried at 50°C and a pressure of 11 mm. In this way, a nickel complex containing the triazole mentioned is obtained as a blue-green powder which is readily soluble in ligroin and which contains acetate ions. Its nickel content is 7.8% and its nitrogen content is 12.8%.

EXAMPLE 8

42.5 g (0.100 M) of 2-[2-hydroxy-5-(1,1,3,3-tetramethylbutyl)phenyl]-4,5-diphenyl-1,2,3(2H)-triazole are dissolved in 500 ml of absolute ethanol and converted into the phenolate by adding 121.7 ml of a 1 molar sodium ethylate solution. 8.84 g (0.05 mol) of anhydrous nickel acetate are then dissolved in 4,000 ml of absolute ethanol by adding 1.3 g of glacial acetic acid. This solution is now added dropwise to the solution of the phenolate at 25°C and the clear reaction mixture is evaporated to dryness. The residue is extracted with cold hexane, and the extract is again evaporated and dried at 50°C and a pressure of 11 mm. In this way, a nickel complex of the abovementioned triazole is obtained as a light green product containing acetate ions. It is readily soluble in hexane and contains 5.5% of nickel and 8.6% of nitrogen.

EXAMPLE 9

A solution of 22.9 g (0.10 mol) of 2-(2-hydroxy-5-methyl-phenyl)-4,5,6,7-tetrahydrobenzotriazole in 460 ml of ethanol is slowly added dropwise to 12.4 g (0.05 mol) of nickel acetate tetrahydrate and 11.0 g (0.15 mol) of n-butylamine in 1,200 ml of ethanol. Hereupon the nickel salt of the triazole mentioned, containing water of hydration, separates out as a yellow-green sparingly soluble precipitate. It contains 11.4% of nickel and 15.5% of nitrogen.

The triazoles used in this example and in the following Examples 10 to 17 are obtained from the corresponding benzotriazoles by low pressure hydrogenation, which is carried out in ethyl acetate solution at room temperature, with Raney nickel as the catalyst.

EXAMPLE 10

8.84 g (0.05 mol) of anhydrous nickel acetate, which are dissolved in 800 ml of absolute ethanol with addition of 1.56 g of glacial acetic acid, are added dropwise to a solution of 22.9 g (0.100 mol) of 2-(2-hydroxy-5-methyl-phenyl)-4,5,6,7-tetrahydrobenzotriazole and 47.1 g (0.176 mol) of oleylamine in 460 ml of absolute ethanol. Hereupon a precipitate separates out, which is dissolved by adding 1,800 ml of benzene. This solution is evaporated and the residue is washed with 400 ml of cold ethanol and dried at 80°C and a pressure of 11 mm. In this way a green nickel complex of the triazole mentioned, containing acetate ions, is obtained, which is readily soluble in cold benzene. It contains 8.3% of nickel and 13.1% of nitrogen.

EXAMPLE 11

22.9 g (0.10 mol) of 2-(2-hydroxy-5-methyl-phenyl)-4,5,6,7-tetrahydrobenzotriazole and 26.7 g (0.10 mol) of oleylamine in 230 ml of benzene are treated with a solution of 31.3 g (0.05 mol) of nickel stearate in 260 ml of benzene. The clear solution thereby produced is heated for 30 minutes under reflux and then evaporated to dryness and the solid residue is extracted with cold hexane. After evaporating off the extractant, a nickel complex of the triazole mentioned is obtained in the form of a blue-green residue which is soluble in cold ligroin. It contains stearate ions, 6.1% of nickel and 9.7% of nitrogen.

EXAMPLE 12

27.1 g (0.10 mol) of 2-(2-hydroxy-5-tert.butyl-phenyl)-4,5,6,7-tetrahydrobenzotriazole dissolved in 1,000 ml of methanol are slowly added to a solution of 6.47 g (0.05 mol) of anhydrous nickel chloride and 7.31 g (0.10 mol) of n-butylamine in 2,000 ml of methanol at 25°C. A yellow-green suspension is produced, which is heated under reflux for 30 minutes. The precipitate is then filtered off and dried at 80°C and a pressure of 11 mm. In this way, the nickel diphenolate of the triazole mentioned is obtained, which is a yellow sparingly soluble compound containing 9.8% of nickel and 13.9% of nitrogen.

EXAMPLE 13

31.3 g (0.05 mol) of nickel stearate dissolved in 650 ml of benzene are added dropwise to a solution of 27.1 g (0.10 mol) of 2-(2-hydroxy-5-tert.butyl-phenyl)-4,5,6,7-tetrahydrobenzotriazole and 40.1 g (0.15 mol) of oleylamine in 650 ml of benzene at 25°C. The solution, which hereupon remains clear, is concentrated to dryness and the residue is extracted with methylene chloride at 45°C. After evaporating the extractant, a nickel complex of the triazole mentioned is obtained in the form of a waxy light green residue, containing stearate ions, which is soluble in hot ligroin. It contains 2.7% of nickel and 6.6% of nitrogen.

EXAMPLE 14

32.7 g (0.10 mol) of 2-[2-hydroxy-5-(1,1,3,3-tetramethyl-butyl)-phenyl]-4,5,6,7-tetrahydrobenzotriazole are dissolved, and 8.84 g (0.05 mol) of anhydrous nickel acetate are suspended, in a mixture of 550 ml of absolute ethanol and 160 ml of benzene. 13.4 g of glacial acetic acid are now added dropwise under reflux, whereby a clear blue solution is produced into which 323 ml of a 1 molar sodium ethylate solution are added dropwise at 25°C. The clear solution is evaporated to dryness, the residue is extracted with cold chloroform and the solvent is again volatilised. In this way a nickel complex of the triazole mentioned is obtained as a green powder soluble in cold ligroin. It contains acetate ions, 7.3% of nickel and 10.8% of nitrogen.

EXAMPLE 15

8.84 g (0.05 mol) of anhydrous nickel acetate are suspended in a solution of 32.7 g (0.10 mol) of 2-[2-hydroxy-5-(1,1,3,3-tetramethylbutyl)-phenyl]-4,5,6,7-tetrahydrobenzotriazole and 40.0 g (0.15 mol) of oleylamine in 350 ml of absolute ethanol. This mixture is heated to refluxing and 300 ml of benzene are added, whereupon a clear solution is produced which is concentrated to one-third of its volume by evaporation. In the cold, a precipitate separates out from this concentrate, and this precipitate is dried at 60°C and a pressure of 11 mm. A nickel complex of the triazole mentioned, containing acetate ions, is thus obtained as a blue-green product which is readily soluble in hexane and contains 5.7% of nickel and 9.5% of nitrogen.

EXAMPLE 16

32.7 g (0.10 mol) of 2-(2-hydroxy-3,5-di-tert.butylphenyl)-4,5,6,7-tetrahydro-benzotriazole are dissolved in 330 ml of chloroform and neutralised with 100 ml of a 1 molar sodium methylate solution. 31.3 g (0.05 mol) of nickel stearate dissolved in 300 ml of chloroform are added dropwise to this solution and the suspension thereby produced is heated for 30 minutes under reflux. The sodium stearate which precipitates is filtered off and the filtrate is evaporated to dryness. In this way, a nickel complex of the triazole mentioned, containing 23–25% of stearate ions, is obtained, which is soluble in cold benzene and contains 6.5% of nickel and 9.3% of nitrogen.

EXAMPLE 17

34.1 g (0.10 mol) of 2-[2-hydroxy-3,5-di(1,1-dimethylpropyl)-phenyl]-4,5,6,7-tetrahydro-benzotriazole are dissolved in 850 ml of chloroform and neutralised with 100 ml of a 1 molar sodium methylate solution. 31.3 g (0.05 mol) of nickel stearate dissolved in 500 ml of chloroform are added dropwise to this solution and the suspension thereby produced is heated for one hour under reflux. The sodium stearate which precipitates is filtered off and the filtrate is evaporated to dryness. The green residue thereby produced is a nickel complex of the triazole mentioned, containing 13–14% of stearate ions, which is only partially soluble in all solvents and contains 5.8% of nickel and 9.5% of nitrogen.

EXAMPLE 18

1,000 parts of polypropylene powder (melt index: 2.5 g/10 minutes; 230°C/2.16 kg) are mixed, in a drum mixer, with 2 parts of β-(3,5di-tert.butyl-4-hydroxyphenyl)-propionic acid octadecyl ester and 5 parts of a nickel compound of Table I below and subseqeuntly granulated in a Buss Co-kneader at a mass temperature of 200°C.

The granules obtained are converted into a film in the usual manner, by means of an extruder with a slit die, and the film is cut into tapes which are simultaneously warmed in a heating channel, stretched 1:6 and finally wound up. Gauge of the tapes: 900–1,100 den, tenacity: 5.5–6.5 g/den.

The polypropylene tapes manufactured in this way are mounted on sample carriers so as to be free of tension and are exposed to light in the Xenotest 150. After various periods of time, 5 test specimens at a time are withdrawn and their tenacity is determined. The measure used for the protective action of the individual nickel compounds is the "protection factor" which is defined as follows:

"Protection factor" = $\dfrac{\text{Exposure time of the light-stabilised sample until 50\% of ultimate tensile strength is lost}}{\text{Exposure time of the sample which is not light-stabilised, until 50\% of the ultimate tensile strength is lost}}$ (The exposure times are the figures listed in the right-hand column)

Table I

| Ni compound incorporated, according to example | "Protection factor" | Exposure time until 50% ultimate tensity strength is lost |
| --- | --- | --- |
| None | — | 340 |
| 1 | 2.1 | 710 |
| 2 | 2.4 | 820 |
| 3 | 1.3 | 440 |
| 4 | 2.2 | 750 |
| 8 | 2.0 | 680 |
| 9 | 2.1 | 710 |
| 10 | 2.7 | 920 |
| 11 | 4.3 | 1,460 |
| 12 | 2.3 | 780 |
| 14 | 5.1 | 1,730 |
| 15 | 4.7 | 1,600 |
| 16 | 2.4 | 810 |
| 17 | 2.4 | 810 |

We claim:

1. Compounds of the formula $$\left[ R_1 \diagdown{\overset{N}{\underset{N}{\diagup}}} N - \diagdown{\overset{R_4}{\diagup}} \right]_x [Y]_y [Z^-]_z Ni^{+2} M_m^{+1} (H_2O)_w \quad (I)$$

in which $R_1$ denotes an alkyl group with 1 to 18 carbon atoms, the phenyl group, or a methylphenyl, dimethylphenyl, chlorophenyl or alkoxyphenyl group, the latter with 7 to 14 carbon atoms, $R_2$ denotes hydrogen or, if $R_1$ denotes an alkyl group with 2 to 18 carbon atoms, also denotes an alkyl group which is one carbon atom lower than $R_1$, and in the case that $R_1$ denotes the phenyl group or a substituted phenyl group, also denotes an alkyl group with 1 to 16 carbon atoms, the phenyl group or a methylphenyl, dimethylphenyl, chlorophenyl or alkoxyphenyl group, the latter with 7 to 14 carbon atoms, or $R_1$ and $R_2$ together denote unsubstituted or lower alkyl-substituted tetramethylene, $R_3$ and $Rk_4$ independently of one another denote hydrogen, an alkyl group with 1 to 18 carbon atoms, an aralkyl group with 7 to 9 carbon atoms, a cycloalkyl group with 6 to 8 carbon atoms or the α-methylcyclohexyl group, with $R_3$ and $R_4$ together containing at most 22 carbon atoms, Y denotes a nitrogen-containing organic base of the following group a. amines of the formula $$N{\diagup{R_5} \atop \diagdown{R_7}} - R_6$$

wherein $R_5$, $R_6$ and $R_7$ independently of one another denote hydrogen, alkyl with 1 to 18 carbon atoms, alkenyl with 3 to 18 carbon atoms, benzyl, cyclohexyl, 2-hydroxyethyl or 2-aminoethyl, or $R_5$ and $R_6$ together denote the radicals $-(CH_2)_5-$, $-(CH_2)_2-O-(CH_2)_2-$, $-(CH_2)_2-NH-(CH_2)_2-$, $-CH(CH_3)-(CH_2)_4-$, $-CH_2-CH(CH_3)-(CH_2)_3-$ or $-(CH_2)_2-CH(CH_3)-(CH_2)_2$, b. anilines of the formula $$H_2N-\diagdown{\bigcirc}-R_8$$

wherein $R_8$ denotes alkyl with 1 to 8 carbon atoms or alkoxy with 1 to 8 carbon atoms, or c. pyridines of the formula $$\underset{N}{\diagdown{\bigcirc}}{R_9 \atop R_{10}}$$

wherein $R_9$ and $R_{10}$ independently of one another denote hydrogen or methyl or $R_9$ and $R_{10}$ together denote a benzo ring, $Z^-$ denotes the anion of an alkanecarboxylic acid with 2 to 18 carbon atoms, an alkenylcarboxylic acid with 3 to 18 carbon atoms, a thia- or oxaalkanecarboxylic acid with 3 to 15 carbon atoms, benzoic acid, an alkylbenzoic acid with 8 to 11 carbon atoms or a naphthoic acid, or denotes the hydroxyl ion, the chloride ion or the bromide ion, $M^{+1}$ denotes a monovalent alkali metal ion and $n$ denotes 0 or 1, $m$ denotes 0, 1 or 2, $x$ denotes 1 or 2, $y$ denotes 0 or 1, $w$ denotes all values between 0 and 2 and $z$ denotes $(2 + m) - x(1 - n)$.

2. Compounds according to claim 1, characterized in that $R_1$ and $R_2$ together denote the tetramethylene radical $-(CH_2)_4-$.

3. Compounds according to claim 1, characterized in that $R_1$ and $R_2$ denote phenyl groups.

4. Compounds according to claim 1, characterized in that $R_1$ denotes the phenyl group and $R_2$ denotes the methyl group.

5. Compounds according to claim 1, characterised in that $R_3$ and $R_4$ denote branched or unbranched alkyl radicals with 1 to 10 carbon atoms.

6. Compounds according to claim 1, characterised in that Y is an amine of the formula

wherein $R_5$ denotes an alkyl or alkenyl radical with 12 to 18 carbon atoms.

7. Compounds according to claim 1, characterised in that $Z^-$ denotes the chloride, acetate, 2-ethylcaproate, palmitate, stearate, oleate or benzoate ion and $M^{+1}$ denotes the sodium or potassium ion.

8. Mixtures of compounds according to claim 1, characterised in that in the compounds the radicals $R_1$, $R_2$, $R_3$, $R_4$, Y, $Z^-$ and $M^{+1}$ are identical and that of the coefficients $x$, $y$, $z$, $n$, $m$ and $w$ at least one is different.

9. Mixtures of compounds according to claim 8, characterised in that $R_1$ and $R_2$ together denote the tetramethylene radical $-(CH_2)_4-$.

10. Mixtures of compounds according to claim 8, characterised in that $R_1$ and $R_2$ denote phenyl radicals.

11. Mixtures of compounds according to claim 8, characterised in that $R_1$ denotes the phenyl group and $R_2$ the methyl group.

12. Mixtures of compounds according to claim 8, characterised in that $R_3$ and $R_4$ denote branched or unbranched alkyl radicals with 1 to 10 carbon atoms.

13. Mixtures of compounds according to claim 8, characterised in that Y denotes an amine of the formula

wherein $R_5$ denotes an alkyl or alkenyl radical with 12 to 18 carbon atoms.

14. Mixtures of compounds according to claim 8, characterised in that $Z^-$ denotes the chloride, acetate, 2-ethylcaproate, palmitate, stearate, oleate or benzoate ion and $M^{+1}$ denotes the sodium or potassium ion.

* * * * *